United States Patent
Stryffeler

(10) Patent No.: US 11,555,535 B1
(45) Date of Patent: Jan. 17, 2023

(54) WORM DRIVE APPARATUS FOR RAILCARS AND METHOD OF USE

(71) Applicant: Adam Stryffeler, Salem, OH (US)

(72) Inventor: Adam Stryffeler, Salem, OH (US)

(*) Notice: Subject to any disclaimer, the term of this patent is extended or adjusted under 35 U.S.C. 154(b) by 0 days.

(21) Appl. No.: 16/512,832

(22) Filed: Jul. 16, 2019

Related U.S. Application Data

(60) Provisional application No. 62/698,508, filed on Jul. 16, 2018.

(51) Int. Cl.
  *F16H 1/16*    (2006.01)
  *F16H 35/00*   (2006.01)
  *F16H 1/12*    (2006.01)
  *B61D 19/00*   (2006.01)
  *E05F 15/00*   (2015.01)

(52) U.S. Cl.
  CPC .......... *F16H 35/00* (2013.01); *F16H 1/125* (2013.01); *B61D 19/005* (2013.01); *E05F 15/00* (2013.01); *E05Y 2201/71* (2013.01); *F16H 2035/006* (2013.01)

(58) Field of Classification Search
  CPC . F16H 1/12; F16H 1/125; F16H 35/00; F16H 2035/006; F16H 1/16; E05Y 2201/71; E05F 15/00; B61D 19/005
  See application file for complete search history.

(56) References Cited

U.S. PATENT DOCUMENTS

| | | | | |
|---|---|---|---|---|
| 6,644,215 | B1 * | 11/2003 | Mundinger | .......... B61D 19/009 105/240 |
| 2011/0036678 | A1 * | 2/2011 | Hashizume | ............. F16D 27/06 192/84.91 |
| 2016/0230820 | A1 * | 8/2016 | Matthews | ........... F16D 43/2024 |

\* cited by examiner

*Primary Examiner* — Randell J Krug

(57) ABSTRACT

A worm drive apparatus includes a worm drive assembly having a worm engaged with a worm shaft and positioned within a housing; and a first gear engaged with the worm shaft; a worm wheel positioned within a channel created by the housing, the worm wheel engaged with a shaft extending through the channel; a friction assembly engaged with the worm wheel and the shaft, the friction assembly having a friction disk positioned adjacent to the worm wheel; a lock washer positioned adjacent to the friction disk; and a wave spring positioned adjacent to the lock washer; the friction assembly aids in preventing unwanted movement of the apparatus; and the worm wheel and first gear are to engage.

1 Claim, 3 Drawing Sheets

WORM DRIVE APPARATUS FOR RAILCARS AND METHOD OF USE

BACKGROUND

1. Field of the Invention

The present invention relates generally to railway car systems, and more specifically, to a worm gear drive mechanism for a gear operated railway car door.

2. Description of Related Art

Sliding railway car doors are commonly used in the art and are configured to slide back and forth within an opening to provide access thereto. In FIG. 1, a conventional worm drive system 101 for a gear operated door is shown, which provides for an anti-spin arrangement 103. System 101 includes a drive mechanism 105 engaged with transmission members 109, 111 and further including an operating cam 107 and an antidrift/anti-spin mechanism 103. During use, rotation of the drive mechanism 105 causes the transmission members 109, 111 to rotate to transfer movement. The antidraft/anti-spin mechanism 103 aids in slowing or stopping movement of the door.

Accordingly, although great strides have been made in the area of worm drive apparatuses, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
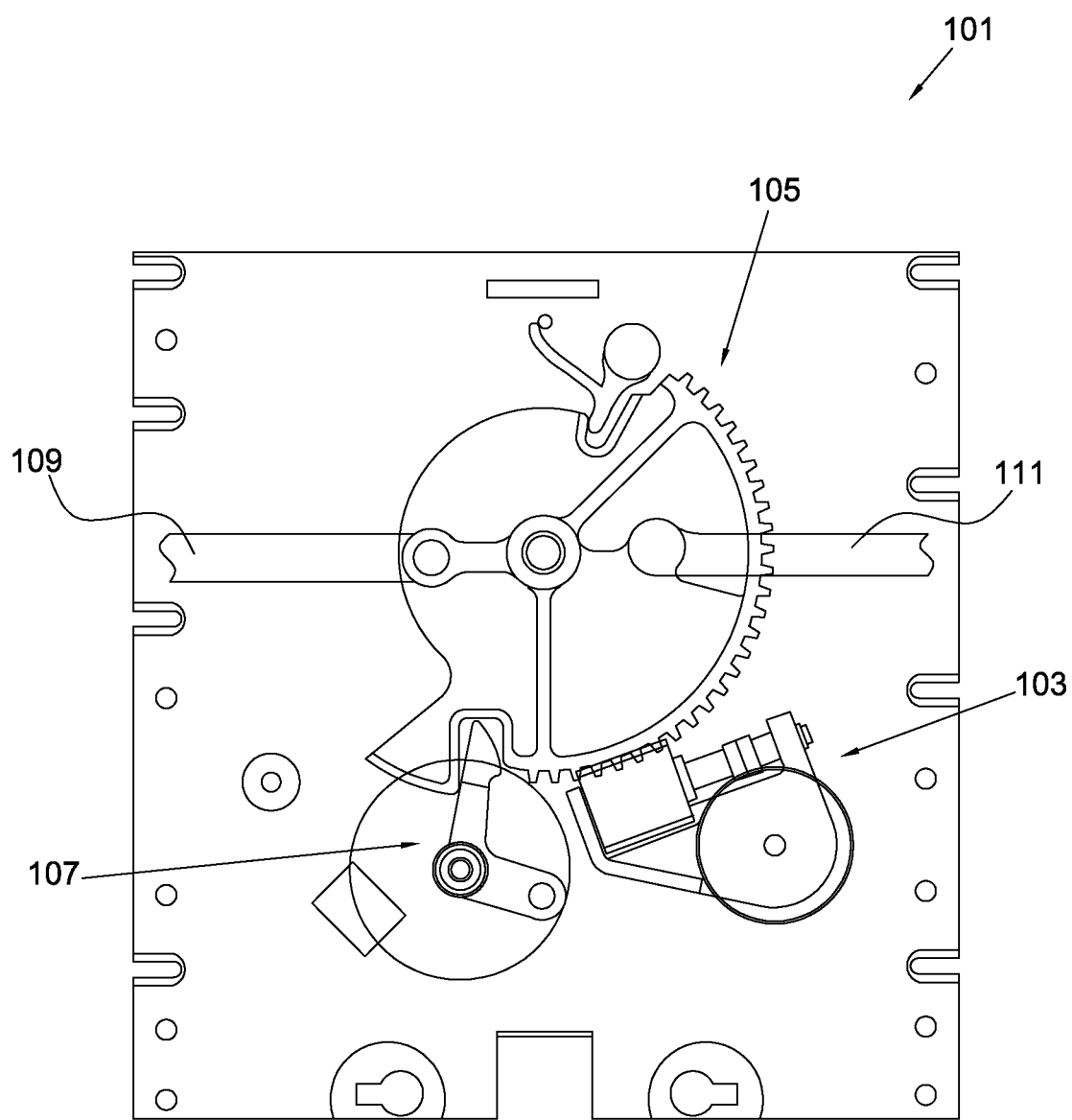
FIG. 1 is a simplified schematic of a conventional worm drive apparatus for railcars.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
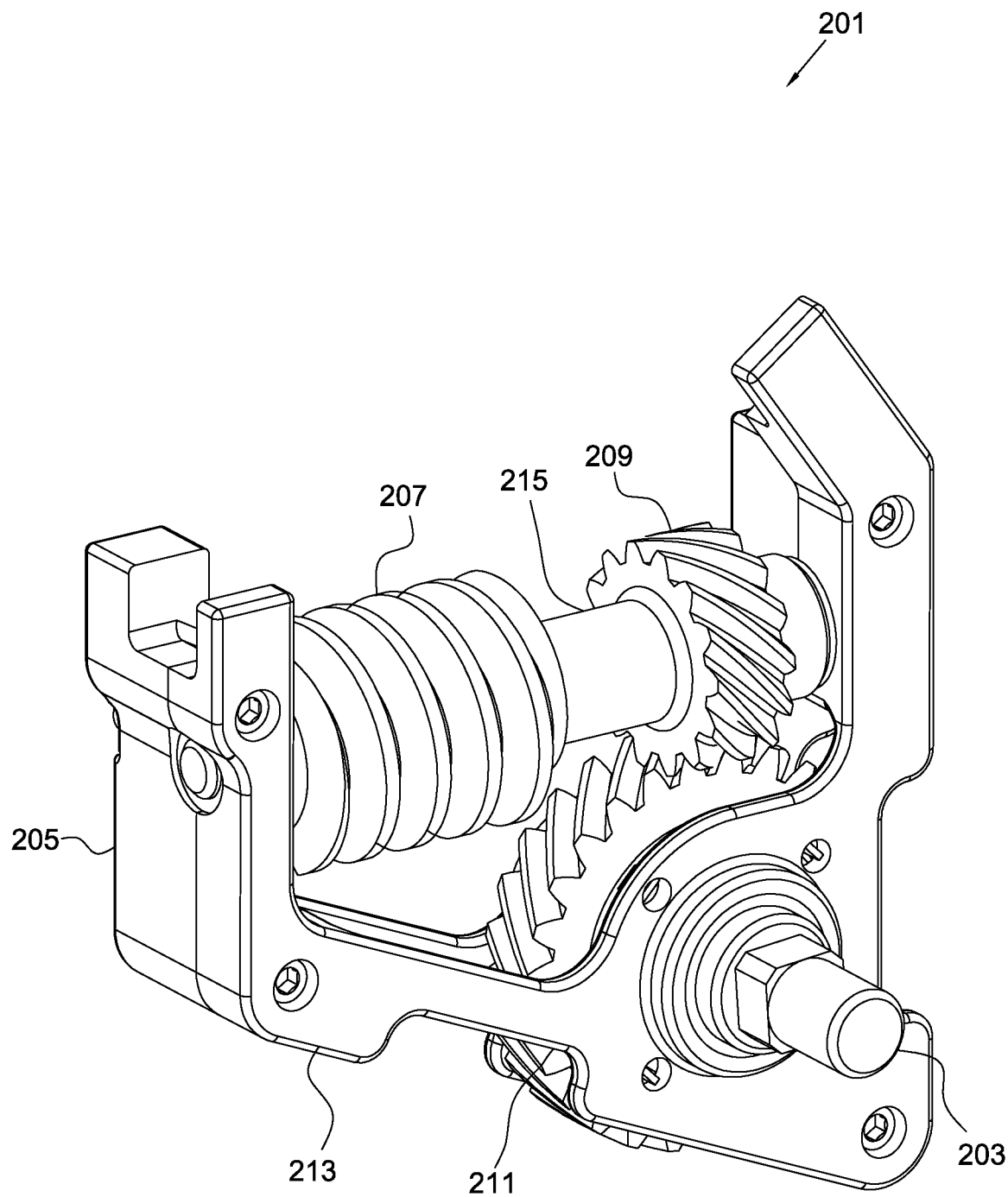
FIG. 2 is an oblique view of a worm drive apparatus in accordance with a preferred embodiment of the present application.
Figure 3:
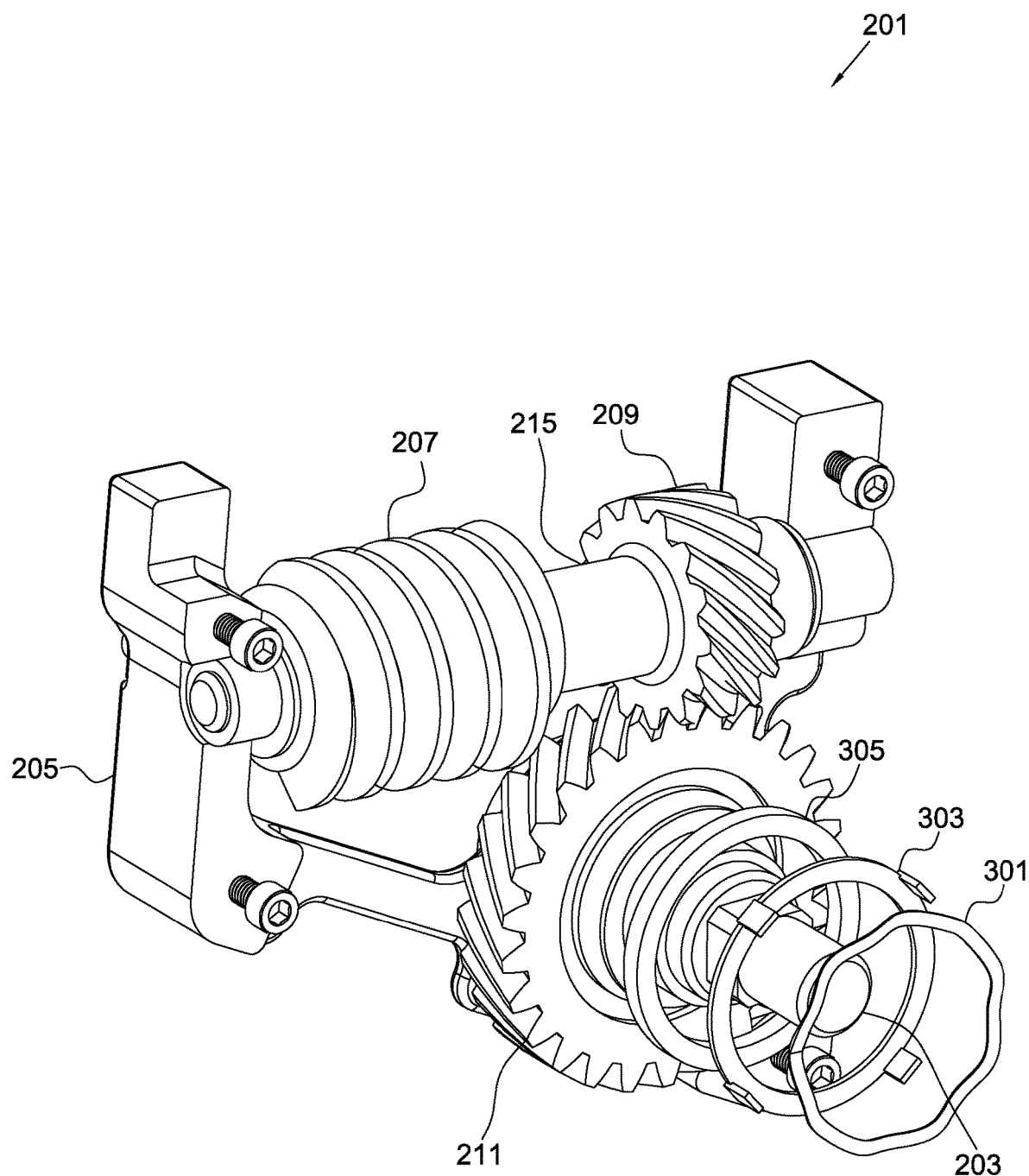
FIG. 3 is an oblique view of the apparatus of FIG. 2 with a friction assembly exploded therefrom for clarity.

Referring now to the drawings wherein like reference characters identify corresponding or similar elements throughout the several views, FIGS. 2-3 depict oblique views of a worm drive apparatus 201 in accordance with a preferred embodiment of the present application.

In the contemplated embodiment, apparatus 201 includes a worm drive assembly, having a worm 207 engaged with a worm shaft 215 and positioned within a housing 205 with gear 209 also engaged with the worm shaft opposite the worm. A worm wheel 211 is engaged with a channel 213 created by the housing and connected to a shaft 203 having a friction assembly engaged therewith. As shown, the shaft 203 extends through the channel and runs perpendicular to the worm shaft.

The friction assembly, shown best in FIG. 3, wherein a side of the housing is removed for clarity, includes a wave spring 301 positioned above a lock washer 303 and further positioned above a friction disk 305. During use, the wave spring 301 is configured to press against the friction disk 305 via the lock washer 303 to aid in preventing movement of the railcar door once pressure is released from the door.

It should be appreciated that one of the unique features believed characteristic of the present application is the friction assembly of the wave spring, lock washer, and friction disk, thereby providing an improved means to prevent unwanted movement of the apparatus.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A worm drive apparatus, comprising:
   a worm drive assembly having:

a worm engaged with a worm shaft and positioned within a housing; and
a first gear engaged with the worm shaft;
a worm wheel positioned within a channel provided within the housing, the worm wheel engaged with a shaft extending through the channel;
a friction assembly engaged with the worm wheel and the shaft, the friction assembly having:
a friction disk positioned adjacent to the worm wheel;
a lock washer positioned adjacent to the friction disk; and
a wave spring positioned adjacent to the lock washer;
wherein the worm wheel and first gear are configured to be engaged.

\* \* \* \* \*